July 10, 1951   S. D. BRADLEY   2,560,408
WEATHERSTRIP
Filed Dec. 10, 1948
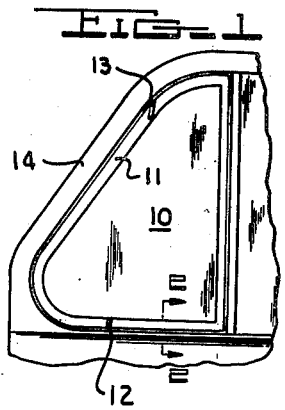
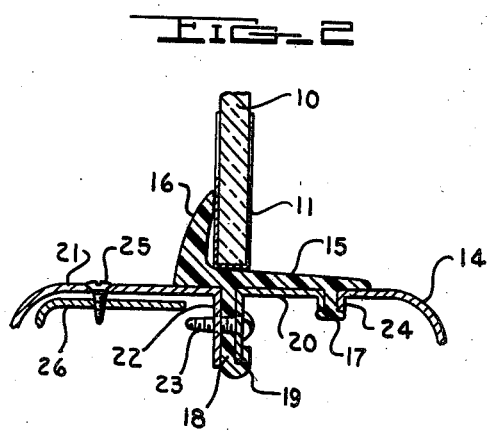
INVENTOR.
STEPHEN D. BRADLEY
BY
ATTORNEY Patented July 10, 1951

2,560,408

UNITED STATES PATENT OFFICE 2,560,408

WEATHERSTRIP

Stephen D. Bradley, Detroit, Mich., assignor to Detroit Macoid Corporation, Detroit, Mich., a corporation of Michigan Application December 10, 1948, Serial No. 64,640

9 Claims. (Cl. 296—44)

The present invention relates to a weatherstrip and more particularly to a weatherstrip of the resilient type which is adapted particularly but not exclusively for use in automobile vehicle body construction where such a weatherstrip is utilized to close the space provided around the peripheral edges of pivotally mounted windows, doors, or the like.

Prior to the present invention, resilient weatherstrips which have been provided for similar uses have been formed of an extruded section of resilient material such as a resilient thermoplastic or rubber. In these prior constructions the resilient lip used to cover the opening between the movable window, door or the like and the frame of the opening was formed as an integral part of a base member which was gripped in a metallic channel unit secured to one of the parts with which the weatherstrip was to be utilized. In order to provide a sufficient body of material for being gripped in such a channel, it was necessary to provide a rather heavy base section in the extruded materials. This reduced the resiliency of the strip and made it difficult to be sure that the resilient sealing lip would at all times overlie the opening to be sealed and conform readily to the contours of the parts which were to be sealed.

As contrasted with such prior known devices, the present invention proposes a weatherstrip which may be formed as an extruded strip of a resilient material in connection with which a novel method of attachment may be utilized so that the entire weatherstrip unit will have sufficient resiliency and flexibility to conform readily to the parts, and thus to effectively seal the opening between the movable members and the fixed members.

It is therefore an object of the present invention to provide an improved type of resilient weatherstrip member which is relatively thin in its cross-section, and which will readily conform to the contours of fixed and movable elements and to seal the opening between such elements.

It is a further object of the present invention to provide a resilient weatherstrip which may be easily and readily attached at its point of intended use and which may be held securely in position, the thin section of the base unit of the weatherstrip making possible a much smaller clearance between the fixed and movable members than the clearance permitted by conventional construction, thus cutting down the width of the peripheral openings to be sealed by the resilient lip of the weatherstrip.

It is a further object of the present invention to provide a novel type of weatherstrip which may be easily produced as an extruded resilient thermoplastic or rubber element having a controlled degree of resiliency in the various parts thereof and which may be readily and economically installed at its point of use.

Other objects of this invention will appear in the following description and appended claims, reference being had to the accompanying drawings forming a part of this specification wherein line reference characters designate corresponding parts in the several views.

In the drawings:

Fig. 1 is a fragmentary side elevation of the front portion of the window in a motor vehicle door showing a pivotally mounted ventilating window in which the weatherstrip of the present invention is incorporated.

Fig. 2 is a section taken substantially on the line 2—2 in the direction of the arrows, Fig. 1.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

While the drawings herein show the weatherstrip of the present invention as used for sealing the space between a pivotally mounted ventilating window and the window frame portion in a door of a motor vehicle body, it is to be understood that the invention is not limited in its scope to such a restricted use. This use has been illustrated in the present drawings because it assists in presenting certain of the important and novel features of the present invention. However, it is to be understood that the weatherstrip of the present invention may be used in any instance where a movable element is mounted in a fixed element and a clearance space is provided around the peripheral portions of the movable element in order to permit its movement relative to the fixed element, and in which it is desired to seal said space by a resilient weatherstrip member when the movable element is moved into closed position relative to the fixed element.

Referring to Fig. 1, the pivotally mounted window 10 is provided with a frame portion 11 which is mounted by the pivot members 12 and 13 in the fixed frame 14 of the door unit here shown. The peripheral space required to provide the necessary clearance between the frame 11 of the window 10 and the fixed frame 14 of the door opening is closed by the resilient weatherstrip of the present invention which is shown in greater detail in Fig. 2.

As shown in Fig. 2, the weatherstrip of the present invention comprises an extruded resilient strip having a resilient, generally wedge shaped base portion 15 whose apex extends through the space to be sealed and whose base lies outside said space and carries an upwardly extending resilient sealing lip 16 whose upper end overlies a portion of the movable member. The sealing lip 16 is curved and tapers inwardly from its base toward its top edge to provide the maximum flexibility of the lip at the point of contact with said movable member. The frame 11 of the movable window 10 seats against the resilient base portion 15 of the weatherstrip of the present invention and presses against the upper end of the upwardly extending lip member 16. As will be seen, this provides a positive seal of the space between the frame 11 of the window 10 and the frame portion 14 of the opening in the door member.

As shown in Fig. 2, the weatherstrip of the present invention is mounted on the frame portion 14 without the use of a retaining channel. The weatherstrip of the present invention when extruded, is formed with an attaching bead 17 and with a downwardly depending resilient flange member 18 having a channel section 19 in its lower end. A metal channel 20 is inserted under the base 15 between the bead 17 and the downwardly depending resilient flange member 18 and has one end seated in the channel 19 and has the other end abutting against the enlarged end portion of the longitudinally extending bead 17. The inside trim molding 21 is formed of sheet metal and is formed to provide a depending flange portion 22 which extends downwardly in spaced, substantially parallel relation to the side of the channel member 20 whose lower edge is mounted in the channel portion 19 of the downwardly extending resilient flange member 18. The spaced parallel portions of the channel 20 and the trim molding 21 are suitably connected as for example by a threaded screw 23 which extends through the two metal pieces and through the downwardly depending resilient flange member 18.

In mounting the present invention in the frame 14, an assembly of the resilient weatherstrip, the metal channel 20 and the interior trim molding 21 are made as above described. This entire assembly is then put in place with the bead portion 17 seated tightly against the downwardly depending lip portion 24 formed on the frame member 14. The interior trim molding 21 is then secured in place by means of the screw 25 which engages with a fixed structural portion 26 of the door member.

From the foregoing it will be seen that I have provided a novel type of resilient weatherstrip which is formed from an extruded section of a resilient material such as a resilient thermoplastic or rubber material, the weatherstrip being relatively thin in cross-section and having a means for attaching it in the space to be sealed which reduces the required spacing between the movable element and the fixed element. The thin sections of resilient material have a minimum amount of inherent rigidity, and thus conform readily to any variations in contour between the movable element and the fixed element. This provides an effective and positive seal between the elements when the movable element is moved to its closed position.

Having thus described my invention, I claim:

1. A weatherstrip to seal the space provided between a fixed element and a pivotally movable element and comprising a body of resilient material formed to provide a base, a downwardly extending resilient flange member near one side of said base, a downwardly extending bead near the other side of said base, and a sealing lip extending upwardly from one side of said base for contacting the movable element in the closed position and for overlying the space between the movable element and the fixed element, a metal support having one end extended against said bead and the other end extended against said resilient flange member to support and reinforce said weatherstrip, and means for connecting said downwardly extending resilient flange member and metal support to a portion of the fixed element.

2. A weatherstrip as claimed in claim 1 and further characterized in that said upwardly extending sealing lip is inwardly curved and gradually decreases in cross section toward its top so that maximum flexibility is provided at the top edge portion of the sealing lip to facilitate its sealing contact with a portion of the movable element.

3. A weatherstrip as claimed in claim 1 and further characterized in that said base has a cross section which decreases from the sealing lip to the other side of the said base, thus allowing free movement of the movable element over the base up to the point where the said movable element contacts the sealing lip and the thicker portion of the base when the movable member is moved to its fully closed position.

4. A weatherstrip adapted to close the space between a fixed window frame having an inside trim molding and the peripheral edges of a pivotally movable vehicle window and comprising a body of resilient material formed to provide a base, a doubly grooved bead extending downwardly from said base near the outer side thereof for engaging the edge of the fixed window frame in one of said bead grooves, a resilient flange member extending downwardly from the said base near the inner side thereof and having a channel formed in the lower edge thereof, a curved sealing lip extending upwardly from the inner side of said base to contact the movable window in the closed position, a metal supporting channel to support and reinforce said weatherstrip secured under said base and between the other bead groove and the channel provided in said downwardly extending resilient flange member, and means for fastening said metal supporting channel and said downwardly extending resilient flange member to the inside trim molding of the fixed window frame.

5. A weatherstrip as claimed in claim 4 and further characterized in that the said upwardly extending sealing lip is curved and gradually decreases in cross section toward the top so that maximum flexibility is provided in the top edge of said sealing lip to form a substantially weathertight seal with the movable window in its closed position.

6. A weatherstrip as claimed in claim 4 and further characterized in that said base has a cross section which decreases from the sealing lip to the outer side of the said base, thus allowing free movement of the window over the base to the point where the said window in its closed position contacts the sealing lip and the thicker portion of the base.

7. A weatherstrip for sealing the peripheral opening between a pivotally mounted movable element and a fixed frame therefor having spaced elements, said weatherstrip comprising a resilient sealing strip having a resilient sealing lip extending upwardly over the peripheral opening and formed as an integral extension on the upper face of a resilient base member, resilient mounting means formed as downwardly depending elements on the under face of said resilient base member extending between said spaced elements, and a metallic reinforcing member secured beneath said base member and between said resilient mounting means and spaced elements of the fixed frame.

8. A weatherstrip as claimed in claim 7 and further characterized in that said resilient base is formed as a wedge whose apex extends through the peripheral opening to be sealed.

9. A weatherstrip as claimed in claim 8 and further characterized in that said resilient sealing lip extends upwardly from said wedge shaped base and curves toward the apex thereof.

STEPHEN D. BRADLEY.

REFERENCES CITED

The following references are of record in the file of this patent:

UNITED STATES PATENTS

| Number | Name | Date |
|---|---|---|
| 1,884,415 | Vrooman | Oct. 25, 1932 |
| 1,966,402 | Barringer | July 10, 1934 |
| 2,258,996 | Morrison | Oct. 14, 1941 |
| 2,361,609 | Doty | Oct. 31, 1944 |